United States Patent
Vasa (10) Patent No.: US 6,826,397 B1
(45) Date of Patent: *Nov. 30, 2004

(54) SYSTEM AND METHOD TO NOTIFY SUBSCRIBERS OF CALL TERMINATING TREATMENT

(75) Inventor: Yojak Vasa, Garland, TX (US)

(73) Assignee: Ericsson Inc, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/378,140

(22) Filed: Aug. 20, 1999

(51) Int. Cl.[7] ............................. H04M 11/90; H04Q 7/20
(52) U.S. Cl. .................... 455/417; 455/461; 455/414.1; 455/445; 455/466; 379/201.01
(58) Field of Search ............................ 455/414.1, 415, 455/417, 433, 560, 412.1–413, 406, 455, 428, 432.1, 460, 459, 461; 379/81, 221.08, 221.09, 211.02, 93.35, 90.01

(56) References Cited

U.S. PATENT DOCUMENTS

| | | | | |
|---|---|---|---|---|
| 5,241,586 A | * | 8/1993 | Wilson et al. | 379/88.11 |
| 5,703,930 A | * | 12/1997 | Miska et al. | 455/417 |
| 5,802,466 A | * | 9/1998 | Gallant et al. | 455/413 |
| 5,845,207 A | * | 12/1998 | Amin et al. | 455/417 |
| 5,933,778 A | * | 8/1999 | Buhrmann et al. | 455/417 |
| 6,006,087 A | * | 12/1999 | Amin | 455/413 |
| 6,011,969 A | * | 1/2000 | Vargas et al. | 455/423 |
| H1894 H | * | 10/2000 | Fletcher et al. | 455/403 |
| 6,141,410 A | * | 10/2000 | Ginzboorg | 379/14 |
| 6,219,551 B1 | * | 4/2001 | Hentila et al. | 455/445 |
| 6,246,889 B1 | * | 6/2001 | Boltz et al. | 379/245 |
| 6,298,231 B1 | * | 10/2001 | Heinz | 455/412 |
| 6,311,055 B1 | * | 10/2001 | Boltz | 379/196 |
| 6,373,817 B1 | * | 4/2002 | Kung et al. | 370/217 |
| 6,418,306 B1 | * | 7/2002 | McConnell | 455/413 |
| 6,463,277 B1 | * | 10/2002 | Miska et al. | 455/410 |
| 6,615,042 B1 | * | 9/2003 | Britt et al. | 455/433 |
| 6,628,763 B1 | * | 9/2003 | Mani | 379/93.35 |
| 2002/0181683 A1 | * | 12/2002 | Mani | 379/201.01 |

* cited by examiner

Primary Examiner—Erika Gary
Assistant Examiner—Kamran Afshar (57) ABSTRACT

A telecommunications system and method is disclosed for notifying a called subscriber of call terminating treatment applied by the network to calls unable to be completed to the called subscriber at the terminal associated with the originally dialed called party number. When a call to a called subscriber is not completed to the called subscriber, the network logs call information, such as the calling party number, calling party name (if available) and the date and time the call was received. In addition, the network also logs call treatment information, such as the called party number that the call was forwarded to, an indication of whether or not the call was completed to the forwarded to number, an indication that the network was busy or an indication that the called mobile subscriber could not be located. This call information and call treatment information is later provided to the called subscriber.

32 Claims, 8 Drawing Sheets

SYSTEM AND METHOD TO NOTIFY SUBSCRIBERS OF CALL TERMINATING TREATMENT

BACKGROUND OF THE PRESENT INVENTION

1. Field of the Invention

The present invention relates generally to telecommunications systems and methods for applying call terminating treatment to incoming calls, and specifically to informing the called subscriber of the call terminating treatment applied to incoming calls.

2. Background of the Present Invention

For various reasons, there are times when an incoming call to a called subscriber cannot be completed to that called subscriber. In some cases, this is due to the called subscriber's activity. For example, the called subscriber may be involved in another call at the time the incoming call is received. Alternatively, the called subscriber may not be available or may choose to not answer the call when the telephone rings.

The particular call terminating treatment applied to these incoming calls by the network provider depends in part upon the call terminating features subscribed to by that called subscriber. For example, the called subscriber may subscribe to a call forwarding feature, which forwards the incoming call to another called party number specified by the called subscriber.

In other cases, the network may not be able to complete the call to the called subscriber due to network conditions. For example, the network may currently be experiencing a high volume of calls, and may be unable to allocate network resources to complete the call. Alternatively, if the called subscriber is a mobile subscriber, the mobile subscriber may be roaming in an area that does not provide service to the mobile subscriber. In this case, the network may not be able to locate the mobile subscriber to complete the call.

Whenever call terminating treatment is applied to an incoming call that cannot be completed to the called subscriber, in many cases, the called subscriber will have no knowledge of the call or how the call was handled. For example, if the network is busy or the mobile subscriber cannot be located, the network does not typically provide a record of the call to the called subscriber. In addition, if the caller has a do not disturb feature or the call is forwarded to another called party number, the called subscriber is not usually notified of the call at the terminal associated with the originally dialed called party number.

Information on the call terminating treatment for unanswered calls may be useful to called subscribers for many reasons. For example, the called subscriber may be expecting an important phone call, and may wish to know when the call was received, how it was handled and the reasons the call could not be completed. Currently, there is no way to inform the called subscriber of the call terminating treatment applied by the network when the call cannot be completed to the called subscriber.

SUMMARY OF THE INVENTION

The present invention is directed to telecommunications systems and methods for notifying a called subscriber of call terminating treatment applied by the network to calls unable to be completed to the called subscriber at the terminal associated with the originally dialed called party number.

When a call to a called subscriber is not completed to the called subscriber at the called party number, the network logs call information, such as the calling party number, calling party name (if available) and the date and time the call was received. In addition, the network also logs call treatment information, such as the called party number that the call was forwarded to, an indication of whether or not the call was completed to the forwarded-to number, an indication that the network was busy or an indication that the called mobile subscriber could not be located. This call information and call treatment information is later provided to the called subscriber. For example, if the called subscriber is a wireless subscriber, the network can send a short message to a Mobile Station (MS) associated with the mobile subscriber when the MS next registers with the network. This short message can be displayed to the called subscriber on the MS. Alternatively, if the called subscriber is a wireline subscriber that subscribes to a voice mail system, the network can forward the call information and call treatment information to the voice mail box associated with the called subscriber for later retrieval by the called subscriber.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
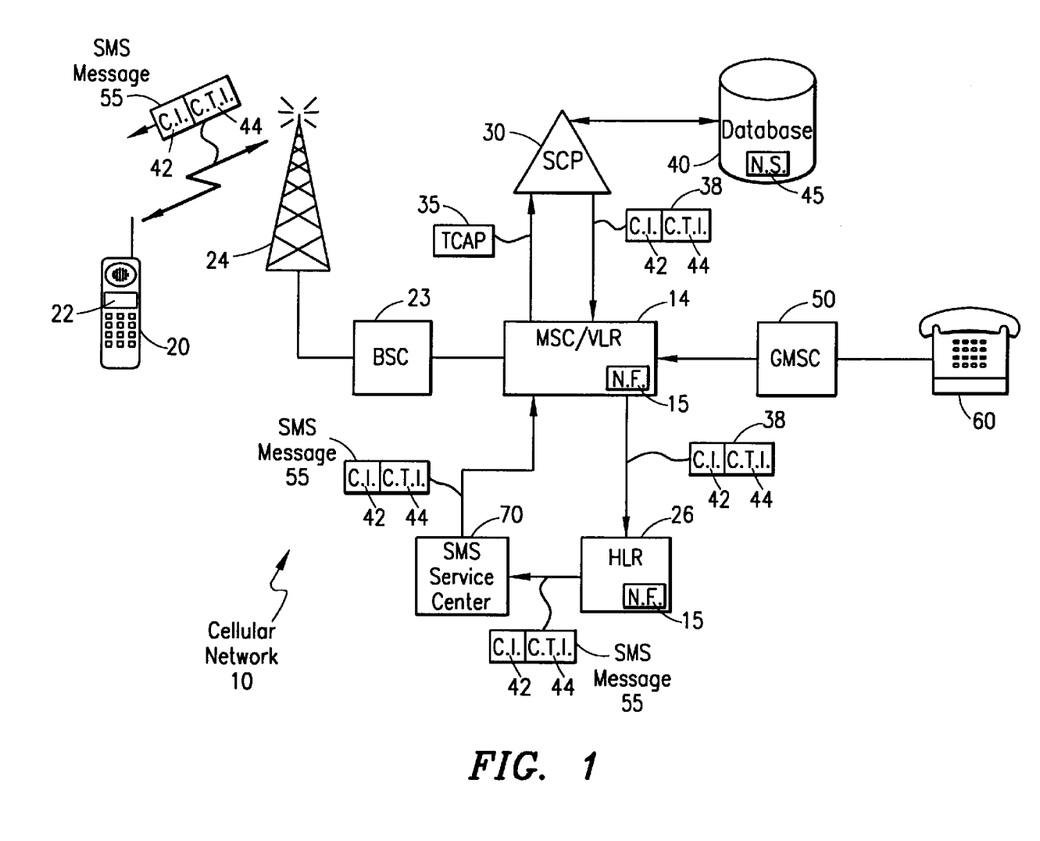
FIG. 1 is an exemplary block diagram illustrating the recordation and transmittal of call treatment information associated with a call not able to be completed to a called mobile subscriber, in accordance with embodiments of the present invention.

Calls may not be able to be completed to a called subscriber due to either network difficulties or to the actions or conditions of the called subscriber. With reference now to FIG. 1 of the drawings, if an incoming call cannot be completed to a called subscriber due to network difficulties, in order to notify the called subscriber of the call terminating treatment applied to the call, call treatment information can be logged by the network and later transmitted to the called subscriber when the network conditions improve.

If, as shown in FIG. 1, the called subscriber is a mobile subscriber, when a calling subscriber 60 places a call to the mobile subscriber, the called party number dialed by the calling subscriber 60 is a number associated with a Mobile Station (MS) 20 of the called mobile subscriber. The MS 20 is the physical equipment, e.g., a car phone or other portable phone, used by mobile subscribers to communicate with a cellular network 10 currently serving the MS 20, each other, and users outside the subscribed network, both wireline and wireless.

The cellular network 10 serving the MS 20 includes at least a Mobile Switching Center/Visitor Location Register (MSC/VLR) 14 in wireless communication with the MS 20 via a Base Station Controller (BSC) 23 and a Base Transceiver Station (BTS) 24. The MSC/VLR 14 provides a circuit switched connection of speech and signaling information between the MS 20 and the cellular network 10. The BSC 23 performs the radio-related functions, such as speech coding and assigning radio resources, while the BTS 24 is the physical equipment, illustrated for simplicity as a radio tower, that provides radio coverage to the area for which it is responsible.

The cellular network 10 also typically includes a Home Location Register (HLR) 26, which is a database maintaining all subscriber information, e.g., user profiles, current location information, International Mobile Subscriber Identity (IMSI) numbers, and other administrative information, for subscribers registered within that cellular network 10. When an MS 20 moves into an area serviced by a new MSC/VLR 14, the MS 20 sends a location update message to the MSC/VLR 14, which in turn, updates the HLR 26 with the current location of the MS 20 and retrieves subscriber information from the HLR 26 pertaining to the MS 20.

Thus, when the calling subscriber 60 dials the called party number associated with the called MS 20, a Gateway Mobile Switching Center (GMSC) 50 within the cellular network 10 receives the call and queries the HLR 26 for routing information for that MS 20. This routing information is used by the GMSC 50 to route the call to the MSC/VLR 14 currently serving the MS 20. When the MSC/VLR 14 receives the call, the MSC/VLR 14 applies call terminating treatment to the call. Normally, the call terminating treatment would involve MSC/VLR 14 paging the MS 20 to establish a call connection with the MS 20. However, if the network 10 is busy, or if the network 10 is having difficulty completing calls, the call terminating treatment typically involves the MSC/VLR 14 notifying the calling subscriber 60 that the call cannot be completed at this time due to network difficulty.

In these situations, the called mobile subscriber would normally have no knowledge that the calling subscriber 60 attempted to reach the called mobile subscriber. However, with the present invention, the network 10 can log all of the call information 42, such as the calling party name and number (if available) and the date and time of the call, in addition to logging the call treatment information 44 associated with the call. Thereafter, the network 10 can forward this call information 42 and call treatment information 44 to the called MS 20 once the network conditions have improved.

Figure 2:
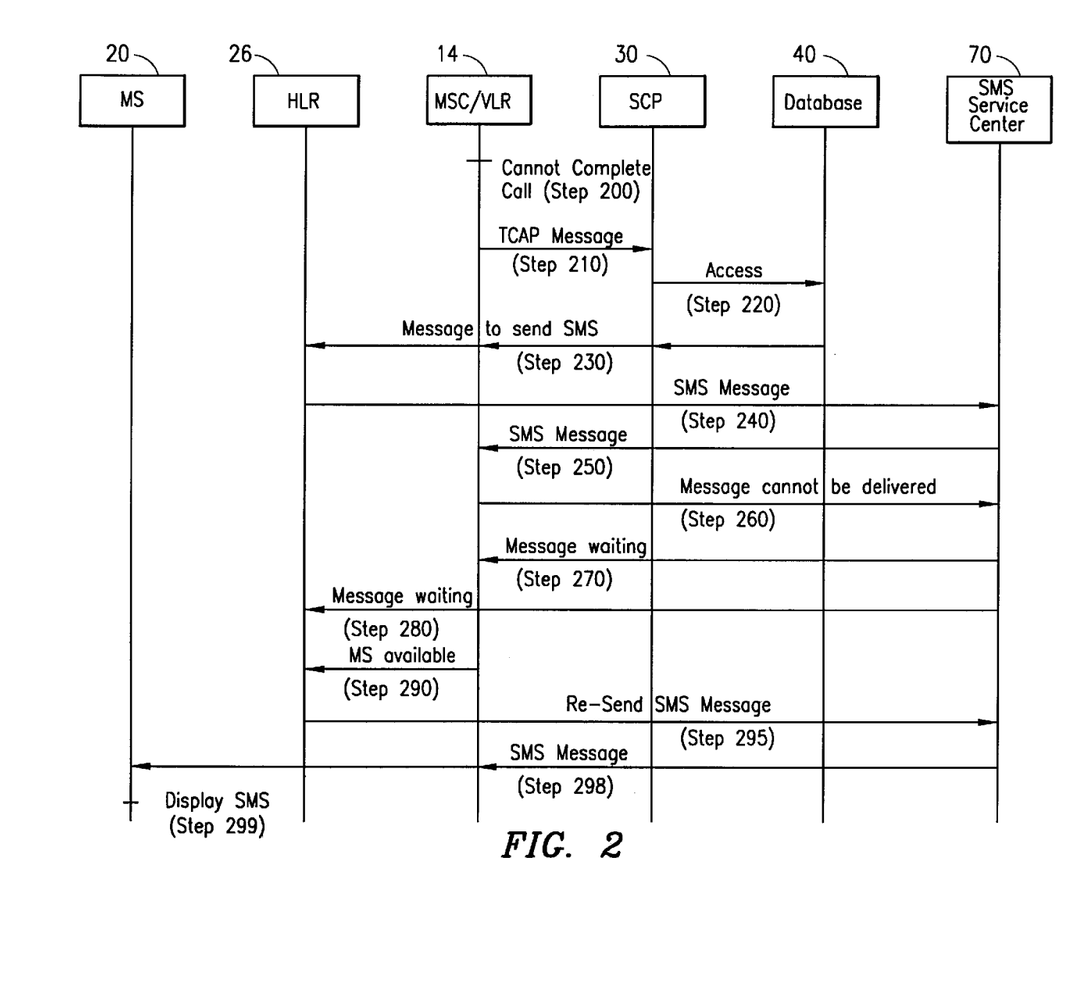
FIG. 2 is a signaling diagram illustrating the signaling involved in the call treatment process shown in FIG. 1 of the drawings.

The signaling involved in an exemplary process for notifying the called subscriber of the call treatment information is shown in FIG. 2 of the drawings, which will be described in connection with the diagram shown in FIG. 1 of the drawings. To provide this notification, the called mobile subscriber can subscribe to a notification service 45, which is stored in a database 40 within the Intelligent Network (IN). A notification flag 15 is stored in the HLR 26 and is passed to the serving MSC/VLR 14, so that when the MSC/VLR 14 is not able to complete the call to the MS due to network difficulties (step 200), the notification flag 15 triggers the sending of a Transactions Capabilities Application Part (TCAP) message 35 to a Service Control Port (SCP) 30 within the IN (step 210). The SCP 30 provides database 40 access, and acts as an interface to a computer that houses the database 40, as is understood in the art.

Upon receiving the TCAP message 35, the SCP 30 accesses the database 40 housing the notification service 45 for the called mobile subscriber, and provides the notification service 45 with the call information 42 and call treatment information 44 from the MSC/VLR 14 (step 220). Upon receiving this call information 42 and call treatment information 44, the notification service 45 sends a message 38, including the call information 42 and call treatment information 44, to the HLR 26, via the SCP 30, the MSC/VLR 14 and possibly the GMSC 50, instructing the HLR 26 to forward a short message 55 containing the call information 42 and call treatment information 44 to the MS 20 (step 230). The HLR 26 sends the short message 55 to the MS using, for example, the Short Message Service (SMS).

For example, initially, the HLR 26 can formulate and send the SMS message 55 to a SMS Service Center 70 for processing (step 240). Thereafter, the SMS Service Center 70 can forward the SMS message 55 to the MSC/VLR 14 serving the MS 20 (step 250). If the network is still busy or experiencing difficulties, the MSC/VLR 14 will not be able to deliver the SMS message 55 to the MS 20. In this case, the MSC/VLR 14 notifies the SMS Service Center 70 that the SMS message 55 cannot be delivered to the MS 20 (step 260). In response, the SMS Service Center 70 stores the SMS message 55, and notifies the MSC/VLR 14 (step 270) and the HLR 26 (step 280) that there is an SMS message 55 waiting for the MS 20.

Once the network is again able to reach the MS 20, the MSC/VLR 14 notifies the HLR 26 (step 290), which in turn, requests the SMS Service Center 70 to re-send the SMS message 55 to the MS 20 (step 295). Once received (step 298), the SMS message 55 can be displayed to the called mobile subscriber on a display 22 of the MS 20 (step 299). For example, the SMS message 55 could. read: "At 3:00 p.m. on Aug. 1, 1999, you received a call from John Doe at 214-555-5555. The call could not be completed due to network difficulties."

Alternatively, if the MS 20 has roamed outside of the network 10 into an area that does not provide cellular service, the MS 20 would not be registered with any MSC/VLR 14, and the HLR 26 would not be able to route incoming calls to the MS 20. In this case, the HLR 26 would transmit the TCAP message 35 to the SCP 30. Since the HLR 26 does not have any routing information for the MS 20, the SMS message 55 formulated by the HLR 26 will not have any routing information associated therewith. Therefore, the SMS Service Center 70 will not be able to route the SMS message 55 to the MS 20. However, once the MS 20 registers with a MSC/VLR 14, and a location update is performed to the HLR 26, the HLR 26 will provide the routing information for the MSC/VLR 14 to the SMS Service Center 70, which will use this routing information to transmit the SMS message 55 to the MS 20.

In other situations, the call may not be able to be completed to the called subscriber due to actions or conditions of the called subscriber. For example, with reference now to FIGS. 3A and 3B of the drawings, the called subscriber may subscribe to a do not disturb feature (not shown) or a call forwarding service 58, which forwards the call to a different forward-to number 59. The call forwarding service 58 and forward-to number 59 are usually stored in the subscriber record in the HLR 26 (in a cellular network 10) or in the end office (in the Public Switched Telephone Network (PSTN)).

Figure 3A:
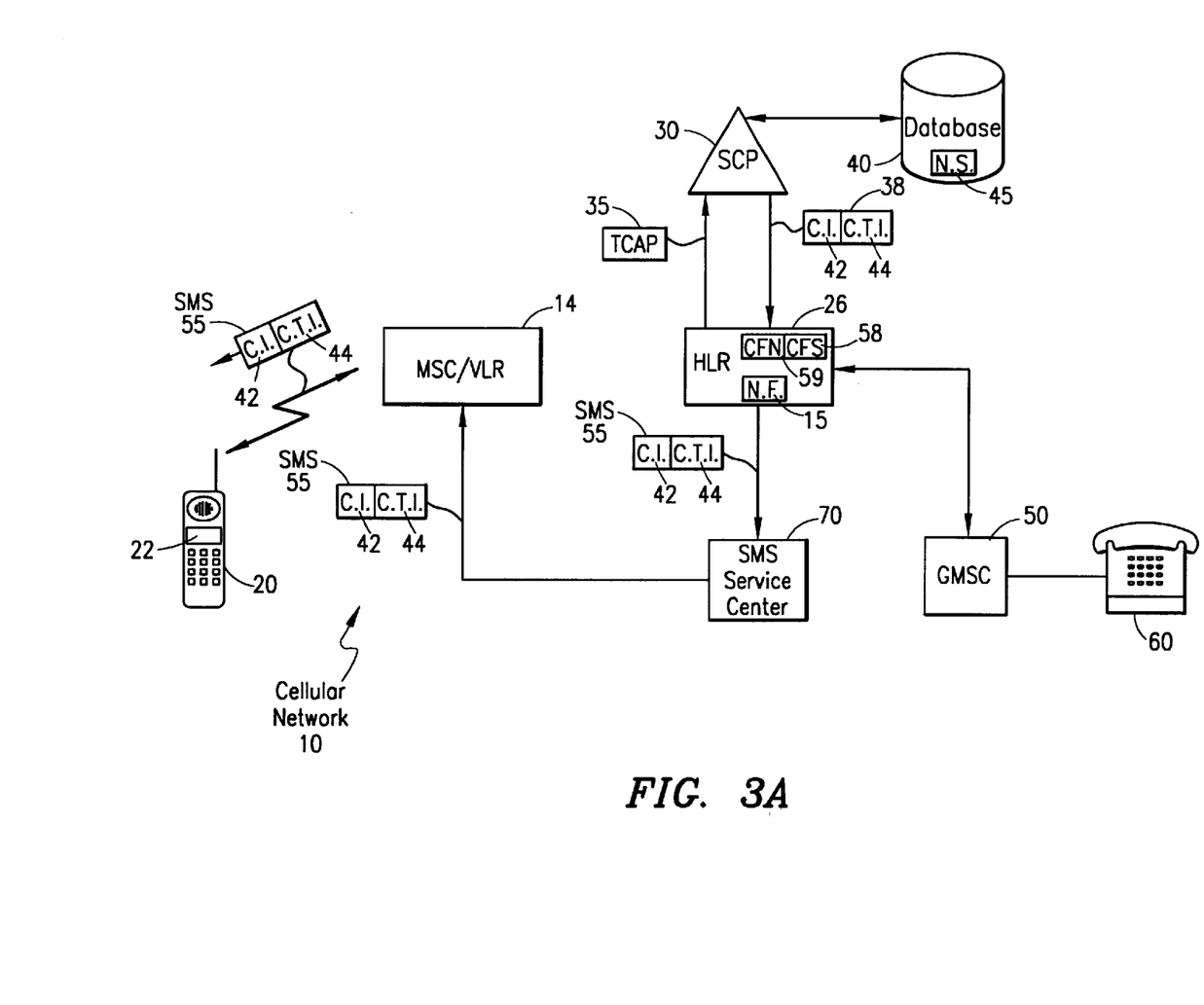
FIGS. 3A and 3B are exemplary block diagrams illustrating the recordation and transmittal of call treatment information associated with a call forwarded to another number, in accordance with embodiments of the present invention.
Figure 3B:
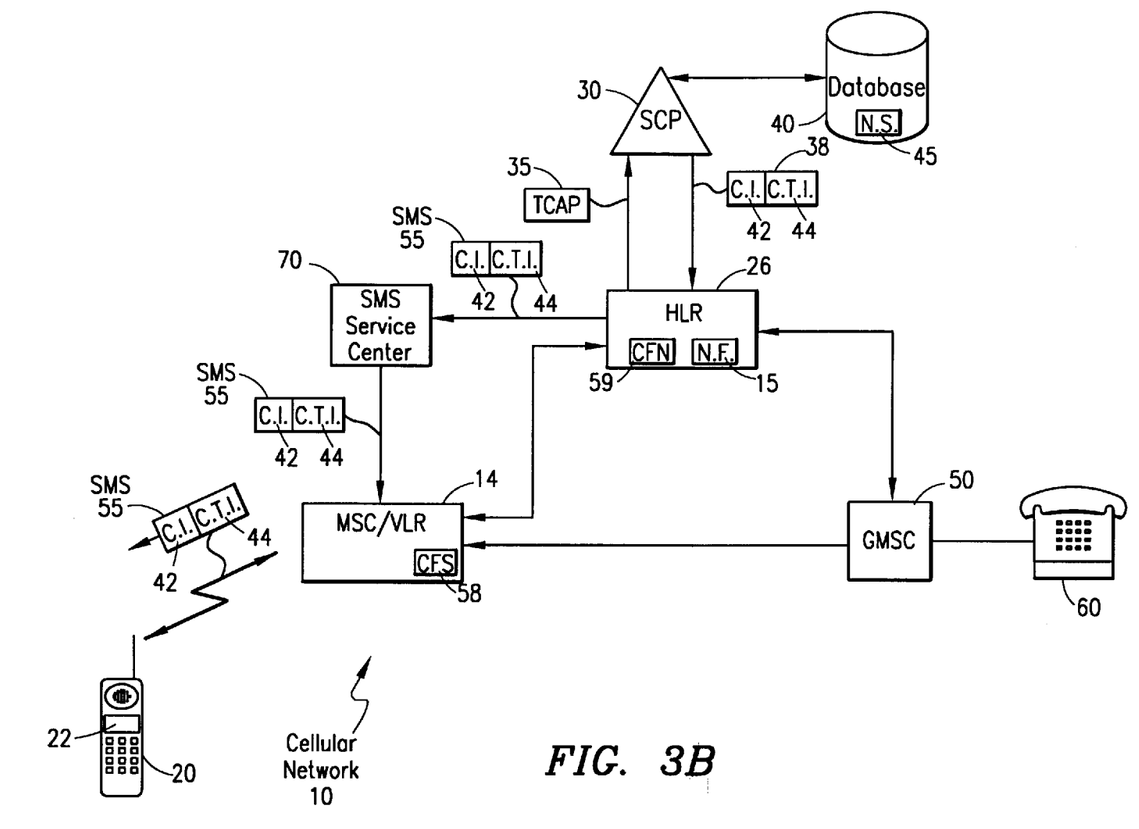

There are several different types of call forwarding services 58 available in telecommunications networks. For example, one type of call forwarding service 58 is the Call Forwarding Unconditional (CFU) service, which forwards all incoming calls to the called subscriber to a pre-defined number 59. Another type of call forwarding service 58 is the Call Forwarding On Busy (CFB) service, which only forwards incoming calls to the pre-defined number 59 when the called subscriber is busy. The Call Forwarding No Answer (CFA) service is similar to CFB service, except that calls to the called subscriber are forwarded only if the subscriber does not answer the call after a predetermined time period. For cellular networks, the Call Forwarding No Page Response (CFP) service is used instead of the CFA service. With the CFP service, calls to the mobile subscriber with this service are forwarded to the pre-defined number 59 if the MS 20 does not respond to the paging process in the cellular network 10.

Figure 4A:
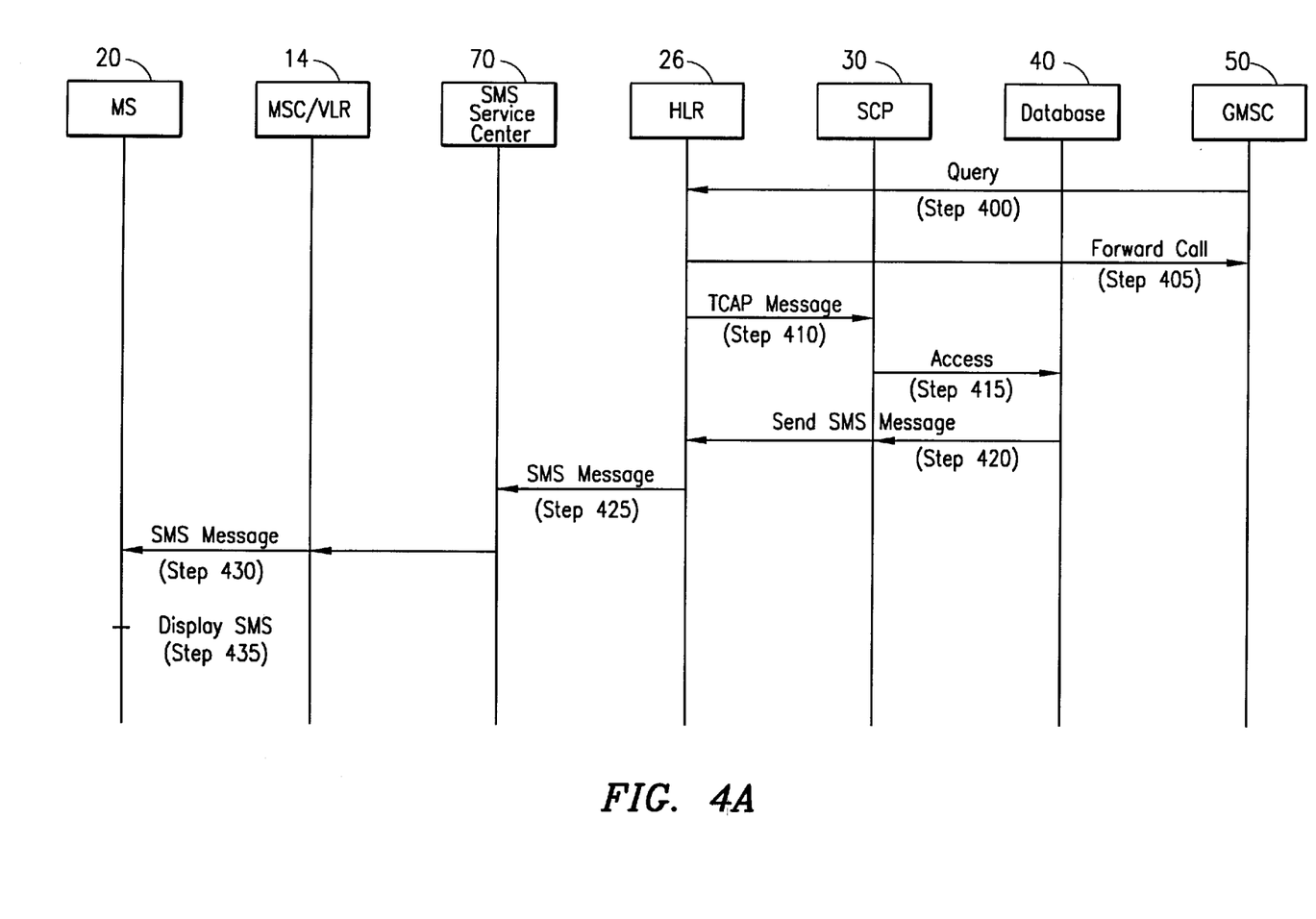
FIGS. 4A and 4B are signaling diagrams illustrating the signaling involved in the call forwarding scenarios shown in FIGS. 3A and 3B, respectively, of the drawings.

With reference now to FIG. 3A of the drawings, which will be described in connection with the signaling diagram shown in FIG. 4A of the drawings, if the called subscriber is a mobile subscriber and subscribes to the CFU service 58, when a call from a calling party 60 is received at the GMSC 50 through the Public Switched Telephone Network (PSTN) (not shown), the GMSC 50 queries the HLR 26 of the called mobile subscriber for the current location of the called mobile subscriber (step 400). In addition, the GMSC 50 typically transmits the calling party number (call information 42) to the HLR 26. If the called mobile subscriber subscribes to the CFU service 58, the HLR 26 will instruct the GMSC 50 to route the call to the pre-defined forward-to number 59 (step 405).

At this point, if the called mobile subscriber subscribes to the notification service 45, the notification flag 15 within the HLR 26 will trigger the HLR 26 to send the TCAP message 35 to the SCP 30, along with the call information 42 sent by the GMSC 50 and call treatment information 44, which includes the pre-defined forward-to number 59 (step 410). Thereafter, the notification service 45 within the database 40 accessible by the SCP 30 (step 415) will instruct the HLR 26 to formulate and send a SMS message 55 to the called MS 20 containing the call information 42 and the call treatment information 44 (step 420). To send this SMS message 55, the HLR 26 retrieves the routing information for the MS 20 (if available), and sends this SMS message 55 to the SMS Service Center 70 (step 425) for transmission to the MS 20 via the serving MSC/VLR 14 (step 430). Upon receipt of the SMS message 55 by the MS 20, the SMS message 55 can be displayed to the called mobile subscriber on the MS display 22 (step 435). For example, the SMS message 55 can read: "A call from John Doe of 214-555-5555 received at 10:30 am Feb. 1st 1999 was forwarded to 972-555-5555."

Figure 4B:
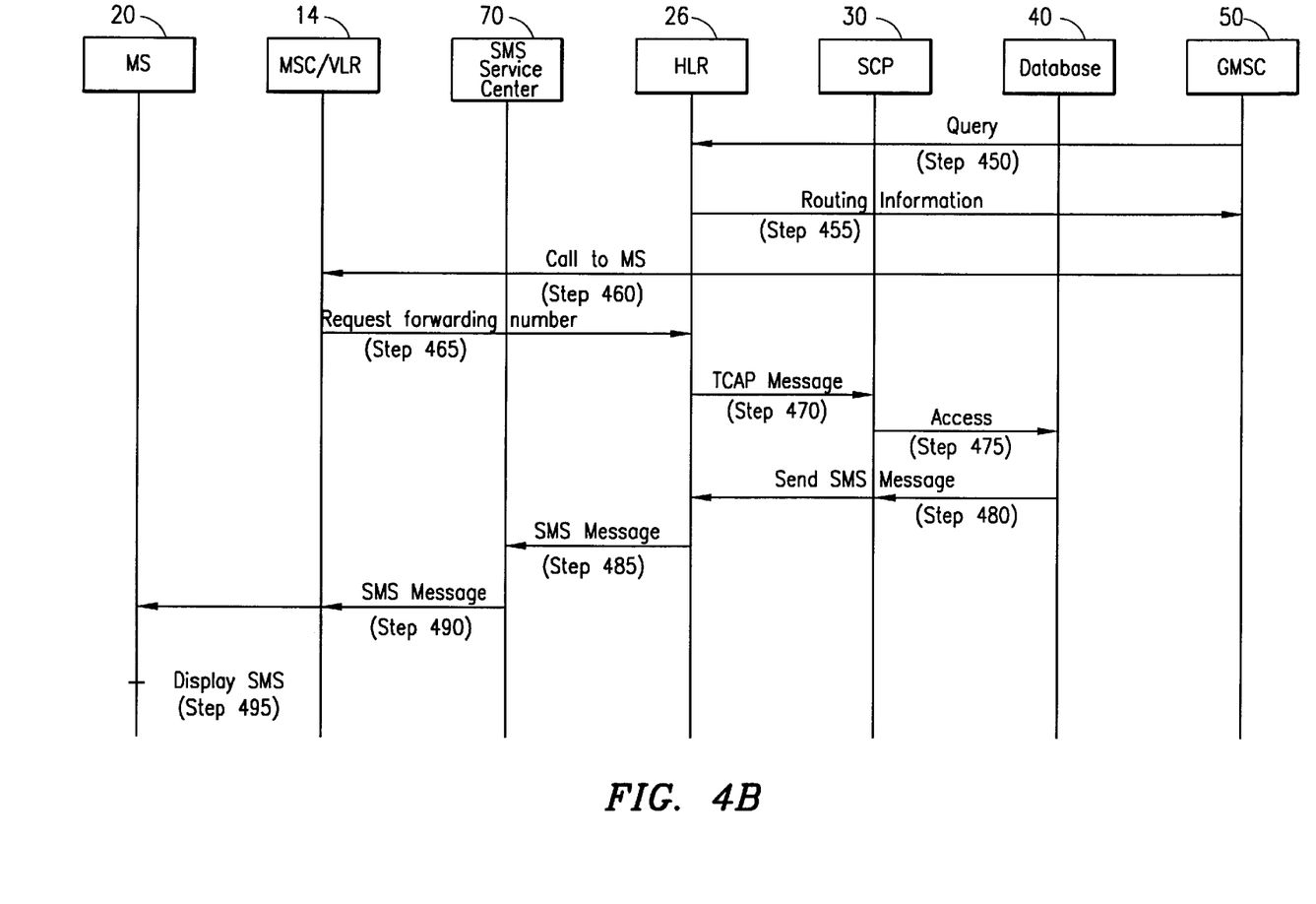

With reference now to FIG. 3B of the drawings, which will be described in connection with the signaling diagram shown in FIG. 4B of the drawings, if the called subscriber subscribes to any of the other call forwarding services 58, such as CFB, CFA or CFP, upon receipt of the call by the GMSC 50, and querying of the HLR 26 (step 450), the HLR 26 will determine if the subscriber is available. If the subscriber is not available, and does subscribe to one of the call forwarding services 58, the HLR 26 will transmit the forward-to number 59 to the GMSC 50 and transmit the TCAP message 35 to the SCP 30, as discussed above. However, if the called mobile subscriber is available, the HLR 26 retrieves the routing information for the MS 20, and sends this routing information back to the GMSC 50 (step 455). Thereafter, the GMSC 50 routes the call to the serving MSC/VLR 14 (step 460).

If the MS 20 does not respond to paging attempts by the MSC/VLR 14 or if the MS 20 is busy, the serving MSC/VLR 14 determines that the called mobile subscriber is not available, and may request the forward-to number 59 from the HLR 26 (step 465) or the SCP 30 (if the call forwarding service is an IN service). When the HLR 26 receives the request for the forward-to number 59, the notification flag 15 is triggered, and the HLR 26 sends the TCAP message 35 to the SCP 30 (step 470). Alternatively, if the forward-to number 59 is stored in the MSC/VLR 14, as well as the HLR 26, the MSC/VLR 14 can send the TCAP message 35 to the SCP 30, as shown in FIG. 1 of the drawings.

Once the notification service 45 within the database 40 processes the call information 42 and call treatment information 44 (step 475), the notification service 45 instructs the HLR 26 to formulate and send the SMS message 55 to the called MS 20 containing the call information 42 and the call treatment information 44 (step 480). Thereafter, the HLR 26 sends this SMS message 55 to the SMS Service Center 70 (step 485) for transmission to the MS 20 via the serving MSC/VLR 14 (step 490). Again, if the MS 20 cannot be reached, the SMS Service Center 70 will store the SMS message 55, and notify the HLR 26 and the MSC/VLR 14 that there is an SMS message 55 waiting for the MS 20. Once the network 10 is able to reach the MS 20, the MSC/VLR 14 will notify the HLR 26, which in turn, will request the SMS Service Center 70 to re-send the SMS message 55 to the MS 20. Upon receipt of the SMS message 55, the SMS message 55 can be displayed to the called mobile subscriber on the MS display 22 (step 495).

In an alternative embodiment, after the call has been successfully or unsuccessfully delivered to the forward-to number 59 by the GMSC 50 or MSC/VLR 14, the MSC/VLR 14 or GMSC 50, whichever completed the transfer, can send a message to the HLR 26, indicating whether the call was successfully transferred or not. This message can trigger the notification flag 15 within the HLR 26 to send the TCAP message 35 to the SCP 30. Thus, the call treatment information can also include an indication of whether or- not the call was successfully forwarded to the forward-to number 59.

In a further alternative embodiment, if the call is delivered to the serving MSC/VLR 14, and the called MS 20 does not respond to paging or is busy, but the called mobile subscriber does not subscribe to one of the call forwarding services 58, the notification flag within the MSC/VLR 14 can also be triggered to send the TCAP message 35 to the SCP 30, as discussed above in FIG. 1.

In still a further alternative embodiment, instead of the notification service 45 being an IN service, the notification service 45 can be provided locally by the HLR 26. In this case, the HLR 26 would not send the TCAP message 35 to the SCP 30, but rather would accumulate itself all of the call information 42 and call treatment information 44, formulate the SMS message 55 and send the SMS message 55 to the MS 20. However, providing the notification service 45 within the HLR 26 requires additional storage capacity and functionality to be included in the HLR 26. In addition, the notification service 45 would not be able to be provided if the MSC/VLR 14 does not notify the HLR 26 of network difficulties or does not request the forward-to number 59 from the HLR 26.

This notification service 45 can also be subscribed to by wireline subscribers. For example, with reference now to FIG. 5 of the drawings, which will be described in connection with the signaling diagram shown in FIG. 6 of the drawings, when a call from a calling subscriber 60 to a wireline (PSTN) subscriber 25 comes into an end office 80 associated with the called subscriber 25, the end office 80 attempts to complete the call to the called subscriber 25. If the end office 80 cannot complete the call to the called subscriber 25 (step 600), the notification flag 15 within the end office 80 triggers the end office 80 to send the TCAP message 35 to the SCP 30 (step 610) For example, the call may not be able to be completed because the network 80 is having difficulties completing calls to the called subscriber 25, the called subscriber 25 is busy, the called subscriber 25 does not answer, the called subscriber subscribes to a do not disturb feature or the called subscriber 25 subscribes to a call forwarding service.

Figure 5:
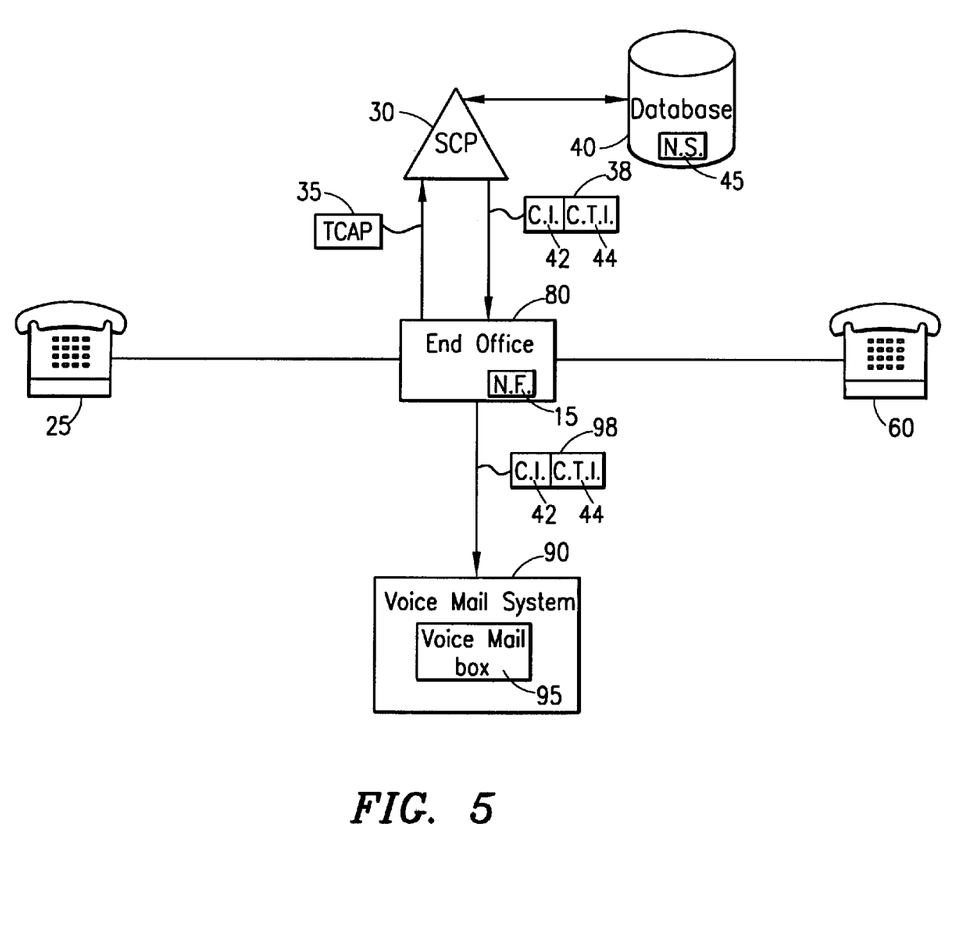
FIG. 5 is an exemplary block diagram illustrating the recordation and transmittal of call treatment information associated with a call to a wireline subscriber, in accordance with embodiments of the present invention.
Figure 6:
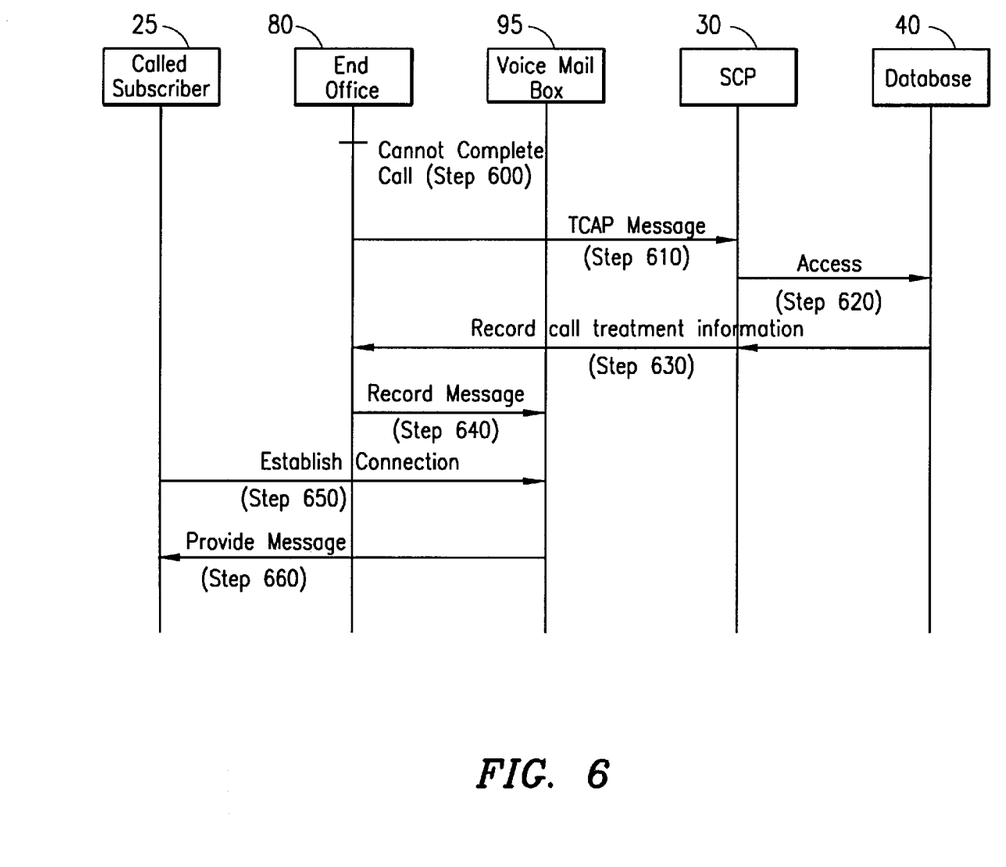
FIG. 6 is a signaling diagram illustrating the signaling involved in the call treatment process shown in FIG. 5 of the drawings.

As discussed above, the SCP 30 accesses the database 40 housing the notification service 45 (step 620), and provides the call information 42 and call treatment information 44 to the notification service 45. The notification service 45 processes the information and sends a message 38 to the end office 80 to provide this information 42 and 44 to the called subscriber 25 (step 630).

For example, if the called subscriber 25 subscribes to a voice mail system 90, the end office 80 can establish a call connection with a voice mail box 95 associated with the called subscriber 25 within the voice mail system 90, and record a message 98 containing the call information 42 and call treatment information 44 within the voice mail box 95 (step 640). Thereafter, when the called subscriber 25 checks the voice mail box 95, e.g., by establishing a call connection with the voice mail box 95 and providing a password or other security code to the voice mail box 95 (step 650), the voice mail box 95 can retrieve the message 98 and allow the called subscriber to listen to this message 98 (step 660).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for notifying a called subscriber of call terminating treatment, comprising:
   a node for applying call terminating treatment to an incoming call to the called subscriber if said incoming call cannot be completed to said called subscriber and
   a database for housing a notification service associated with said called subscriber, said notification service for accumulating call treatment information associated with the call terminating treatment and sending an instruction message to said node, said instruction message requesting said call treatment information be provided to said called subscriber.

2. The telecommunications system of claim 1, wherein said node comprises a home location register associated with said called subscriber, wherein the home location register sends the call treatment information to the called subscriber responsive to the instruction message.

3. The telecommunications system of claim 2, wherein said database is a subscriber record associated with said called subscriber within said home location register.

4. The telecommunications system of claim 2, wherein said call terminating treatment includes not connecting said call to said called subscriber due to routing information associated with said called subscriber not being stored within said home location register or due to a call forwarding service being subscribed to by said called subscriber.

5. The telecommunications system of claim 4, wherein said call treatment information includes a forwarding number when said call cannot be completed due to said called subscriber subscribing to said call forwarding service.

6. The telecommunications system of claim 5, wherein said call treatment information further includes an indication of whether or not said incoming call was successfully transferred to said forwarding number.

7. The telecommunications system of claim 2 further comprising a mobile switching center in wireless communication with a mobile station associated with said called subscriber.

8. The telecommunications system of claim 7, wherein said call treatment information is sent from said home location register to said mobile station via said mobile switching center in a short message to be displayed on said mobile station.

9. The telecommunications system of claim 8, wherein said short message is a Short Message Service message.

10. The telecommunications system of claim 9, further comprising:
    a Short Message Service center for receiving said Short Message Service message from said home location register and transmitting said Short Message Service message to said mobile station.

11. The telecommunications system of claim 2, further comprising:
    a service control point for providing said call treatment information to said notification service within said database and sending the instruction message from said notification service to said home location register.

12. The telecommunications system of claim 11, wherein said home location register includes a notification flag for triggering the sending of a Transactions Capabilities Application Part message to said service control point to access said database if said incoming call cannot be completed to said called subscriber.

13. The telecommunications system of claim 11 further comprising a mobile switching center in wireless communication with a mobile station, said mobile switching center having a notification flag for triggering the sending of a Transactions Capabilities Application Part message to said service control point to access said database if said incoming call cannot be completed to said mobile station.

14. The telecommunications system of claim 13, wherein said call terminating treatment includes not connecting said incoming call to said mobile station due to difficulties with said mobile switching center, said mobile station being busy or said mobile station not answering said incoming call.

15. The telecommunications system of claim 13, wherein the service control point sends the instruction message from the notification service to the home location register via the mobile switching center.

16. The telecommunications system of claim 15 further comprising a home location register associated with the called subscriber, wherein the mobile switching center forwards the instruction message to the home location register, and further wherein the home location register sends the call treatment information to the called subscriber responsive to the instruction message.

17. The telecommunications system of claim 1, wherein said node is an end office associated with said called subscriber.

18. The telecommunications system of claim 17, further comprising:
a voice mail box associated with said called subscriber, wherein the instruction message instructs said end office to record a message containing said call treatment information in said voice mail box.

19. The telecommunications system of claim 17, further comprising:
a service control point in communication with said database, said end office sending a Transactions Capabilities Application Part message to said service control point to access said database, said notification service sending the instruction message to said end office via said service control point.

20. A method for notifying a called subscriber of call terminating treatment, comprising the steps of:
at a node of a telecommunications system, applying call terminating treatment to an incoming call to the called subscriber if said incoming call cannot be completed to said called subscriber;
accumulating call treatment information associated with said call terminating treatment;
providing the call treatment information from the node to a notification service stored in a database, said notification service being associated with the called subscriber; and
receiving an instruction message at the node from the notification service, said instruction message requesting the call treatment information be provided to the called subscriber.

21. The method of claim 20, wherein said step of applying call terminating treatment further comprises the steps of:
retrieving a forwarding number for said called subscriber; and
forwarding said incoming call to said forwarding number.

22. The method of claim 21, wherein said step of accumulating said call treatment information further comprises the steps of:
logging said forwardind number; and
logging an indication of whether or not said incoming call was successfully transferred to said forwarding number.

23. The method of claim 20 further comprising the steps of:
responsive to the instruction message, transmitting said call treatment information from a home location register associated with said called subscriber to a mobile station associated with said called subscriber via a mobile switching center in wireless communication with said mobile station in a short message.

24. The method of claim 23, wherein said step of transmitting comprises the step of:
transmitting said short message to the mobile switching center via a Short Message Service center.

25. The method of claim 20, wherein said steps of providing and receiving involve a service control point in communication with and between said node and said database.

26. The method of claim 20, wherein said node includes a notificaion flag, said step of providing said call treatment information to said database comprising the steps of:
triggering said notification flag if said incoming call cannot be completed to said call subscriber, and
in response to said step of triggering, sending a Transactions Capabilites Application Part message to said database.

27. The method of claim 20 futher comprising the step of:
recording a message containing said call treatment information within a voice mail box associated with said called subscriber responsive to the instruction message.

28. The method of claim 20, wherein the step of accumulating includes accumulating call information associated with the incoming call, further wherein the step of providing includes providing the call information to the database, and further wherein the instruction message also requests the call information be provided to the called subscriber.

29. The telecommunications system of claim 1, wherein the notification service also accumulates call information associated with the incoming call, and further wherein the instruction message also requests the call information be provided to the called subscriber.

30. The telecommunications system of claim 29, wherein said call information includes a calling party number or a date and time the incoming call was receivd at the node.

31. The telecommunications system of claim 29, wherein the instruction message includes the call treatment information and the call information.

32. The telecommunications system of claim 1, wherein the node is a mobile switching center.

* * * * *